April 29, 1958  A. AMBLI  2,832,298
TROLLEY ASSEMBLY
Filed June 11, 1956
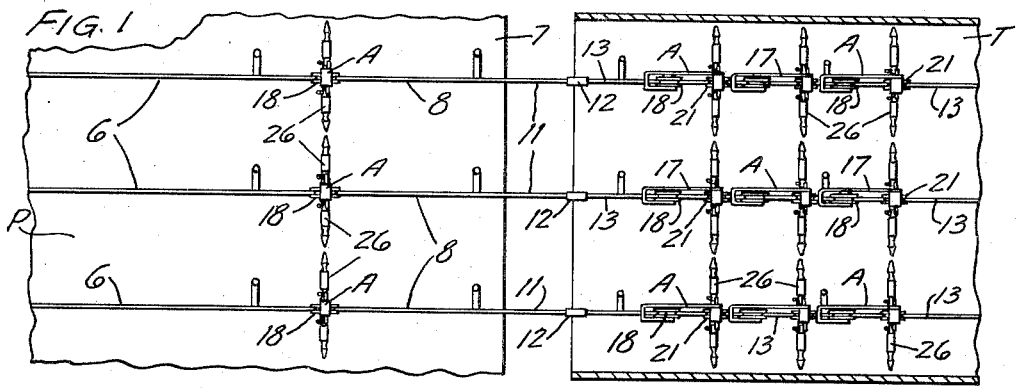
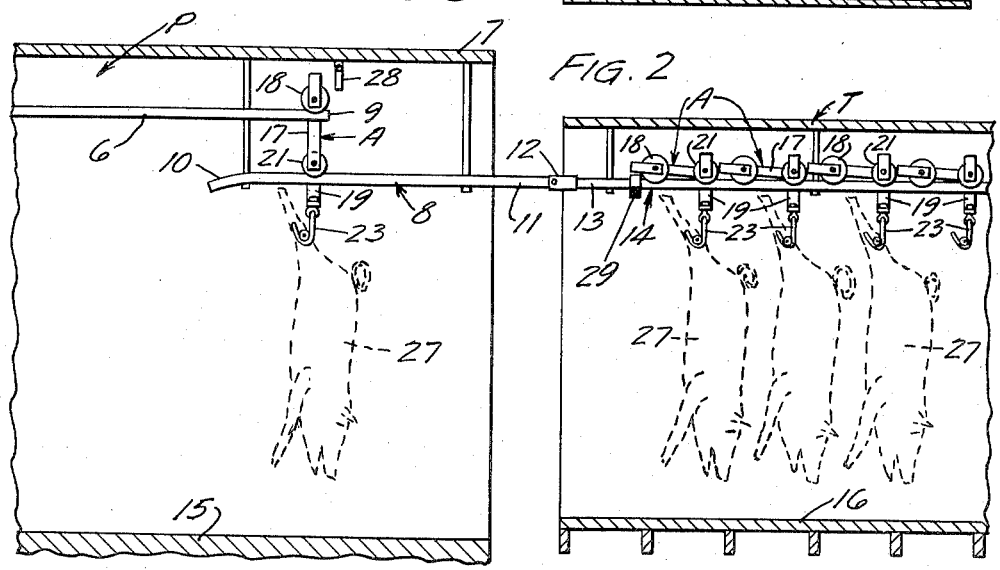
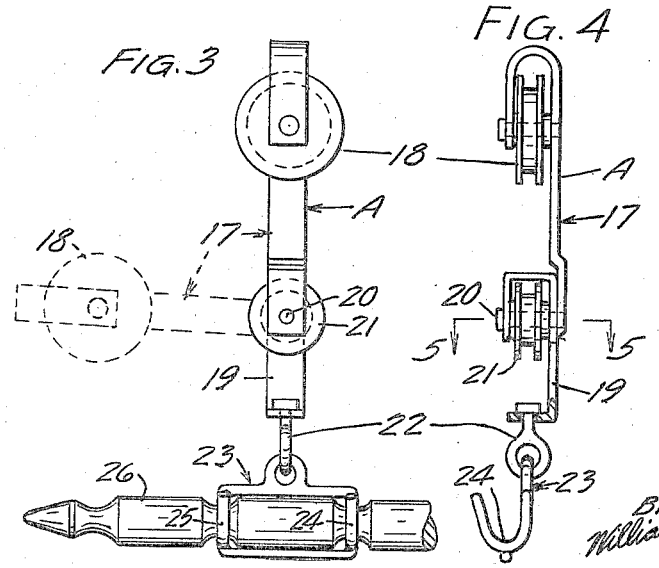
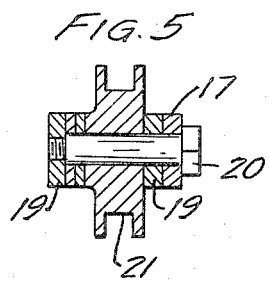
INVENTOR
ANDREW AMBLI
BY Williamson, Williamson, Schroeder, & Adams
ATTORNEYS

United States Patent Office 2,832,298
Patented Apr. 29, 1958

2,832,298

TROLLEY ASSEMBLY

Andrew Ambli, Minneapolis, Minn.

Application June 11, 1956, Serial No. 590,775

12 Claims. (Cl. 104—96)

This invention relates to trolleys. More particularly it relates to trolley assemblies utilized in the movement of dressed animals through buildings such as meat packing houses.

It has long been the common practice in the shipment of dressed animals, such as hogs, by truck trailer or other vehicles to split the hog lengthwise and suspend the separate halves individually on meat hooks which, in turn, are suspended on a track within the trailer. Most meat packing plants have relatively high ceilings from which there is a track suspended. A plurality of separate trolley wheels ride on this track and each has gambrel-supporting means which supports the entire dressed animal. Since the ceiling is high, the hog is normally transported in this manner free and clear of the floor and at an elevation at which it is convenient for the packing plant workers to process the animal. However, when the animal reaches the point of transfer to a truck trailer or a similar relatively low ceilinged construction, these trolleys are unsatisfactory as a means for suspending the animal from the trailer's track or rail for the lower end of the animal will drag upon the floor. As a result of the above, it is conventional practice to have one man split the hog lengthwise with a knife and to have two other men each seize one of the halves, remove it from the gambrel stick, carry it into the trailer or car, and hang it on a movable iron hook which is supported by the rail or track. Normally ten men are utilized in such a truck trailer loading operation and much labor and time is thereby wasted.

In addition to the above, these hooks have disadvantages for the hogs shift while in transit and will slap against each other, causing black spots in the meat which, of course, is undesirable and lowers the value of the animal. For the same reason the conventional trolley assembly as used in packing houses would be unsatisfactory for use in such a vehicle, even if the ceilings or tracks of the packing houses were lowered and a shorter trolley were used, for these assemblies would readily shift during transit with the same undesirable results as described hereinbefore with respect to the use of meat hooks. My invention is designed to overcome these disadvantages.

It is a general object of my invention to provide a novel and improved trolley assembly for use in the handling of dressed animals.

A more specific object is to provide a novel and improved trolley assembly of inexpensive and simple construction through the use of which a substantial saving in labor and time is effected.

Another object is to provide a novel and improved trolley assembly which is readily transferable between and usable in constructions differing widely in ceiling heights.

Another object is to provide a novel and improved trolley assembly having an inherent self-spacing feature relative to other trolley assemblies.

Another object is to provide a novel and improved trolley assembly which obviates the necessity of splitting an animal and removing it from the assembly in order to transfer the same to truck trailer means or other modes of transportation.

Another object is to provide a novel and improved trolley assembly which can be utilized interchangeably within the packing houses, storage warehouses, transportation means, and wholesaler so that the animal need not be transferred therefrom until it is sold by the wholesaler.

Another object is to provide a novel and improved trolley assembly which precludes or substantially reduces the shifting of loads and the slapping of animals against each other while in transit.

Another object is to provide a novel and improved apparatus for quickly and easily transferring dressed animals from a packing house into a truck trailer or railroad car for transportation to the point of consumption.

These and other objects and advantages of my invention will more fully appear from the following description made in connection with the accompanying drawings, wherein like reference characters refer to the same or similar parts throughout the several views, and in which:

Fig. 1 is a plan view of a portion of a packing house on the left and a trailer on the right with the latter shown in horizontal section, and utilizing equipment in accordance with my invention.

Fig. 2 is a vertical sectional view through the construction shown in Fig. 1.

Fig. 3 is a side elevational view of one embodiment of my trolley assembly.

Fig. 4 is a front elevational view of the same.

Fig. 5 is a sectional view taken along line 5—5 of Fig. 4.

Fig. 1 shows a number of trolley assemblies A being used together to transfer a plurality of dressed animals from a packing house P to a truck trailer T. Within the packing house P there are a number of major tracks or rails 6 suspended from the ceiling 7 of the packing house. Also suspended from the ceiling 7 of the packing house is an auxiliary track or rail 8 which may be referred to as a loader track or rail. This auxiliary track is disposed directly below the major track 6 so that the outer end 9 of the major rail extends above the auxiliary track 8. The inner end portion 10 of the loader rail is curved downwardly as best shown in Fig. 2, and the outer end portion 11 of the auxiliary rail is adapted to be connected by a connector sleeve 12 to the rear end 13 of the carrier rail 14 which are suspended from the ceiling of the truck or trailer T, as best shown in Fig. 2.

It will be noted that the ceiling 7 of the packing house is substantially higher from the floor 15 than is the ceiling of the trailer T from the floor 16 of the trailer. As previously stated, most packing houses have relatively high ceilings and in order for the animals to be at a convenient elevation, they are suspended free and clear of the floor. However, when it is desired to transfer these animals to a relatively low ceilinged building or construction such as the trailer T, a problem is presented in that, if the same trolley assembly were utilized, the lower end of the animal would drag on the floor 16 of the trailer T and thus become contaminated.

One form of my trolley assembly is shown in Figs. 3–5. As shown, this assembly A may include an elongated mounting bracket 17 which has an inverted U-shaped member at its upper end. A trolley wheel 18 is rotatably mounted within this U-shaped member. The lower end portion of the bracket 17 is off-set slightly, as best shown in Fig. 4, and to this off-set portion is pivotally connected a second mounting bracket 19. This mounting bracket 19 is relatively short as compared to the mounting bracket 17 and a pivot pin or bolt 20 rotatably mounts a trolley wheel 21 in the upper end portion of the mounting bracket 19 as well as to pivotally connect the two mounting brackets. It will be noted that the mounting bracket 19 also carries a U-shaped member at its upper end which rotatably mounts the trolley wheel 21.

Secured to the lower end portion of the mounting bracket 19 is an eye bolt 22 which carries a gambrel stick carrier indicated generally as 23. The gambrel stick carrier, as shown, includes a pair of hooks 24 and 25 which are spaced from each other and which support the gambrel stick 26 by engaging the same in recesses provided therefor, as best shown in Fig. 3.

Reference to Fig. 3 shows that the elongated bracket 17 is pivotable from an upright position wherein it extends as substantially a continuation of the lower bracket 19 to another position which may be referred to as a trailing position wherein it extends substantially normal to the lower bracket 19. The mounting bracket 17, when in this latter position, functions as a spacing element between the trolley assembly of which the bracket 17 is a portion, and the next successive assembly A.

In use the dressed animals, indicated generally as 27, are supported by the trolley assemblies A as they move along the major track 6 within the packing house in the manner shown in Fig. 2 at the left hand side thereof. It will be noted that, as these animals move along the track 6, they are supported by the trolley 18 on the track 6 and the mounting bracket 19 merely serves as a connecting means between the mounting bracket 17 and the gambrel stick holder 23. As the dressed animals near a desired point of transfer to the trailer T, the trolley 21 engages the downwardly curved end portion 10 of the auxiliary track 8 and the trolley 21 will ride up on to the rail 8 as the trolley 18 approaches the end portion 9 of the major track 6. As the trolley 18 passes off the end 9 of the major track 6, the upper end of the U-shaped member of the mounting bracket 17 engages an abutment 28 which is suspended from the ceiling 7 and this engagement causes the bracket 17 to tilt rearwardly and to fall into the trailing position shown in Fig. 2 at the right hand side of that figure. The support of the dressed animal 27 is thereafter derived from the trolley wheel 21 and the elongated bracket 17 serves as a spacer element between that assembly and the next trolley assembly which will follow it on the rail 8. As best shown in Fig. 1, a number of rails may be utilized simultaneously or, if desired, a single major track 6 and auxiliary track 8 may be utilized with detachable coupling means which can swing from one of the tracks 14 to the other.

As the dressed animals pass on to the tracks 14 they are maintained in spaced relation, as best shown in Fig. 2, and the elongated bracket 17 which serves as a spacer element, positively precludes shifting of the load longitudinally of the trailer and also eliminates or at least substantially reduces the slapping of the animals against each other and thereby darkening the meat and reducing the value of the animal.

As previously described, it has been conventional prior to the use of my trolley assembly to utilize ten men to load a trailer such as T whereas through the use of my trolley assembly, two men accomplish the same job in the same amount of time as was previously required for the ten men. Thus it is readily apparent that my trolley assembly and apparatus for transferring dressed animals from one construction to another effects a substantial saving in both labor and cost. In addition, the dressed animals remain in a better condition while in transit. Another advantage, of course, is that there is no need to transfer the dressed animal from one means of support to another and the trolley assembly A may remain with the animal from the time at which it is first secured thereto until it is removed from the gambrel stick support 23 by the wholesaler. Thereafter, the assembly A may be returned to the packing house for further use in processing the animals and shipment thereof to the ultimate points of consumption.

It will be noted that, through the use of my trolley assembly, the animals 27 are prevented from dragging on the floor 16 of the trailer without requiring that the animal be removed from the gambrel stick 26 or that it be split and hung upon separate meat hooks in which condition they would shift while the load is in transit and would damage the meat by slapping against the individual carcasses.

If desired, the rear door (not shown) on the trailer T, may serve as a lock to keep the individual assemblies from shifting longitudinally or if preferred, a mechanical lock such as the member 29 may be provided to prevent the assemblies A from shifting as a group during shipment.

Thus it can be seen that I have provided a highly improved and novel trolley assembly which, when used with the proper tracks, effects a substantial reduction in the amount of work required to transfer a dressed animal from a relatively high ceilinged construction such as a packing house to a relatively low ceilinged construction such as the trailer T. It will be readily appreciated that a trolley assembly A thereby effects a substantial reduction in labor and expense and therefore is highly desirable from the standpoint of economy in the meat packing industry.

It will, of course, be understood that various changes may be made in the form, details, arrangement and proportion of the parts without departing from the scope of my invention.

What is claimed is:

1. A trolley assembly comprising a trolley wheel, a mounting bracket rotatably mounting said trolley wheel at the upper end portions of said bracket, means connected to the lower end portions of said bracket for engaging and supporting a gambrel, a spacer bracket having one end portion pivotally mounted on said first mentioned mounting bracket, and a second trolley wheel rotatably mounted upon said spacer bracket for rotation about an axis parallel to the axis of rotation of said first mentioned trolley wheel and in spaced relation to said first mentioned trolley wheel, said second trolley wheel being swingable vertically with said spacer bracket relative to said first mentioned trolley wheel.

2. The structure defined in claim 1 wherein said trolley wheels are constructed and arranged to rotate in the same vertical plane.

3. A trolley assembly comprising a mounting bracket, a trolley wheel rotatably mounted on said bracket, said bracket being adapted to have gambrel-engaging means connected thereto, an elongated mounting bracket pivotally mounted on said first mentioned bracket adjacent said trolley wheel, and a second trolley wheel rotatably mounted on said second mentioned bracket in spaced relation to said first mentioned trolley wheel and for rotation about an axis parallel to the axis of rotation of said first mentioned trolley, said second mentioned trolley wheel being swingable vertically with said second mentioned bracket relative to said first mentioned trolley wheel.

4. The structure defined in claim 3 wherein said second mentioned mounting bracket is pivoted about the axis of rotation of said first mentioned trolley wheel.

5. The structure defined in claim 3 wherein said trolley wheels are constructed and arranged to rotate in the same vertical plane.

6. A trolley assembly comprising a mounting bracket having an inverted U-shaped element at its upper end and being adapted at its lower end to have gambrel-engaging means connected thereto, a trolley wheel rotatably mounted within said element for rotation about an axis transverse relative to said bracket, a second and longer bracket pivotally mounted on said first mentioned bracket adjacent said trolley wheel for pivotal movement about an axis parallel to the axis of rotation of said trolley wheel, and a trolley wheel rotatably mounted on the upper end portion of said longer bracket for rotation about an axis parallel to the axis of rotation of said first mentioned trolley wheel, said second mentioned trolley wheel being swingable vertically with said second mentioned bracket relative to said first mentioned trolley wheel, said trolley wheels being constructed and arranged to rotate in the same vertical plane.

7. Apparatus for suspending dressed animals from the roof of a vehicle for transportation therewith, said apparatus including a track suspended from the roof of the vehicle, a plurality of spacer trolley assemblies carried on said track, and mechanism adjacent the rear end of said track locking said assemblies against rearward movement along said track, each of said assemblies comprising a mounting bracket, gambrel-engaging means mounted on said bracket and extending downwardly therefrom, a trolley wheel rotatably mounted on said mounting bracket and riding on said track and supported thereby, a second and longer bracket pivotally mounted by one of its end portions on said first mentioned bracket and extending normally thereto, and a trolley wheel rotatably mounted on the opposite end portion of said longer bracket for rotation about an axis parallel to the axis of rotation of said first mentioned trolley and in the same vertical plane as said first mentioned trolley wheel and riding on said track, said longer bracket engaging the first mentioned trolley wheel of the adjacent trolley assembly and serving as a spacer element to prevent shifting movement of said assemblies longitudinally of said track.

8. Apparatus for transferring dressed animals from a relatively high-ceilinged construction to a relatively low-ceilinged construction, said apparatus including a major track suspended from the ceiling of said first mentioned construction and having an end adjacent the desired point of transfer, an auxiliary track suspended directly below and parallel to said major track and having an inner end positioned inwardly of said major track end and having an outer end, a track suspended from the ceiling of said second mentioned structure at a shorter distance from its ceiling than the distance between said auxiliary track and its supporting ceiling and arranged to extend as substantially a continuation of said auxiliary track and having a free end adjacent the outer end of said auxiliary track, coupling means joining said last mentioned two track ends, and a self-spacing trolley assembly carried by said tracks, said assembly comprising an elongated mounting bracket having upper and lower end portions, a trolley wheel rotatably mounted on the upper end portion of said bracket and riding on said major track and supported thereby, a second and shorter mounting bracket pivotally mounted on the lower end portion of said elongated bracket, a trolley wheel rotatably mounted on said shorter mounting bracket for rotation about an axis parallel to the axis of rotation of said first mentioned trolley wheel and in the same vertical plane, and depending gambrel-engaging means carried by said shorter mounting bracket, the lower riding surface of said second mentioned trolley wheel being spaced from the lower riding surface of said first mentioned trolley wheel a distance equal to the distance between the riding surface of said major track and the riding surface of said auxiliary track whereby as said assembly is moved along said major track toward its end adjacent the desired point of transfer, said second mentioned trolley wheel will engage said auxiliary track and support the assembly thereon after said first mentioned trolley wheel passes beyond said end of said major track whereupon said first mentioned trolley and its elongated mounting bracket may be pivoted rearwardly to ride upon said auxiliary track in trailing position relative to said second mentioned trolley wheel and bracket and said assembly may be moved along said auxiliary track, across said coupling means and onto said track suspended within the low-ceilinged structure, said elongated bracket remaining in trailing position and functioning as a spacer to maintain an adjacent and successive trolley assembly in spaced relation.

9. The apparatus defined in claim 8 and an abutment member positioned just beyond the said end of said major track and constructed and arranged to engage said first mentioned bracket as its trolley wheel disengages said major track to cause it to pivot rearwardly relative to said shorter bracket into trailing position on said auxiliary track.

10. The apparatus defined in claim 8 wherein said inner end of said auxiliary track extends slightly downwardly to facilitate engagement of the trolley wheel of said shorter bracket as said assembly moves along said major track.

11. A trolley assembly comprising a mounting bracket, a trolley wheel rotatably mounted on said bracket, said bracket being adapted to have gambrel-engaging means connected thereto, an elongated mounting bracket pivotally mounted on said first mentioned bracket adjacent said trolley wheel, and a second trolley wheel rotatably mounted on said second mentioned bracket in spaced relation to said first mentioned trolley wheel and for rotation about an axis parallel to the axis of rotation of said first mentioned trolley, said second mentioned bracket member being pivotable between a position extending parallel to said first mentioned bracket and a position extending substantially normally thereto to function as a spacer element between successive trolley assemblies when in the latter position.

12. A trolley assembly comprising a mounting bracket having an inverted U-shaped element at its upper end and being adapted at its lower end to have gambrel-engaging means connected thereto, a trolley wheel rotatably mounted within said element for rotation about an axis transverse relative to said bracket, a second and longer bracket pivotally mounted on said first mentioned bracket adjacent said trolley wheel for pivotal movement about an axis parallel to the axis of rotation of said trolley wheel, and a trolley wheel rotatably mounted on the upper end portion of said longer bracket for rotation about an axis parallel to the axis of rotation of said first mentioned trolley wheel, said trolley wheels being constructed and arranged to rotate in the same vertical plane, said longer bracket being constructed and arranged to freely pivot between a position extending parallel to said first mentioned bracket and a position extending substantially normally thereto to function as a spacer element between successive trolley assemblies when in the latter position.

References Cited in the file of this patent

UNITED STATES PATENTS

| | | |
|---|---|---|
| 852,784 | Hannaford | May 7, 1907 |
| 2,114,929 | Le Fiell | Apr. 19, 1938 |
| 2,718,852 | Cacciatore | Sept. 27, 1955 |
| 2,819,683 | Le Fiell | Jan. 14, 1958 |